(12) United States Patent  (10) Patent No.: US 7,826,098 B2
Suzuki  (45) Date of Patent: Nov. 2, 2010

(54) IMAGE PROCESSING APPARATUS

(75) Inventor: Hiroyuki Suzuki, Toyokawa (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 1220 days.

(21) Appl. No.: 10/024,000

(22) Filed: Dec. 21, 2001

(65) Prior Publication Data

US 2002/0081031 A1   Jun. 27, 2002

(30) Foreign Application Priority Data

Dec. 25, 2000 (JP) ............................. 2000-392232

(51) Int. Cl.
G06K 15/00 (2006.01)
H04N 1/40 (2006.01)

(52) U.S. Cl. ...................... 358/3.09; 358/3.05; 358/462

(58) Field of Classification Search ................ 358/1.9, 358/2.1, 3.05, 3.09, 3.15, 453, 462, 475; 382/119, 171, 176, 177, 185, 199, 225
See application file for complete search history.

(56) References Cited

U.S. PATENT DOCUMENTS

| 3,829,831 | A | * | 8/1974 | Yamamoto et al. | ........... 382/225 |
| 4,813,078 | A | * | 3/1989 | Fujiwara et al. | ............. 382/185 |
| 5,018,216 | A | * | 5/1991 | Kojima | ....................... 382/170 |
| 5,291,309 | A | * | 3/1994 | Semasa | ...................... 358/3.24 |
| 5,341,227 | A | * | 8/1994 | Kumashiro | ................. 358/533 |
| 5,477,335 | A | * | 12/1995 | Tai | .............................. 358/2.1 |
| 5,701,364 | A | * | 12/1997 | Kanno | ......................... 382/176 |
| 5,754,684 | A | * | 5/1998 | Kim | ............................ 358/462 |
| 5,754,708 | A | * | 5/1998 | Hayashi et al. | ............. 382/266 |
| 6,504,949 | B2 | * | 1/2003 | Matsukubo et al. | ......... 382/162 |
| 6,631,210 | B1 | * | 10/2003 | Mutoh et al. | ................. 382/176 |

FOREIGN PATENT DOCUMENTS

| EP | 0 611 051 A1 | 8/1994 |
| JP | 05-344329 | 12/1993 |
| JP | 6-223172 | 8/1994 |
| JP | 07-264399 | 10/1995 |

(Continued)

OTHER PUBLICATIONS

U.S. Appl. No. 09/568,669—"Image Processing Apparatus, Image Processing Method and Computer Program Product for Image Processing".

(Continued)

*Primary Examiner*—James A Thompson
(74) *Attorney, Agent, or Firm*—Buchanan Ingersoll & Rooney PC

(57) ABSTRACT

An isolation point counting section, an internal edge counting section, and a continuity detecting section are provided at a halftone dot internal character region signal generating section. The halftone dot internal character region signal generating section discriminates a character region in a halftone dot image based on the detection results of the isolation point counting value caused by the isolation point counting section, the internal edge count value caused by the internal edge counting section, and the presence or absence of continuity of the internal edges caused by the continuity detecting section by making best use of the fact that the halftone dot region and character region in the halftone dot image are completely reversed in their characteristics.

20 Claims, 16 Drawing Sheets

FOREIGN PATENT DOCUMENTS

| | | |
|---|---|---|
| JP | 08-181864 | 7/1996 |
| JP | 11-073503 | 3/1999 |
| JP | 11-88707 | 3/1999 |
| JP | 2000-175032 | 6/2000 |
| JP | 2000-307869 | 11/2000 |
| JP | 2000-333014 | 11/2000 |

OTHER PUBLICATIONS

A Notification of Reason for Refusal issued in corresponding Japanese Patent Application No. 2000-392232, and translation thereof.

* cited by examiner

FIG. 5

PRIMARY DIFFERENTIAL FILTER
(MAIN SCANNING DIRECTION)

| 16 | 0  | 0 | 0   | -16 |
|----|----|---|-----|-----|
| 32 | 32 | 0 | -32 | -32 |
| 32 | 64 | 0 | -64 | -32 |
| 32 | 32 | 0 | -32 | -32 |
| 16 | 0  | 0 | 0   | -16 |

FIG. 6

PRIMARY DIFFERENTIAL FILTER
(SUB-SCANNING DIRECTION)

| 16  | 32  | 32  | 32  | 16  |
|-----|-----|-----|-----|-----|
| 0   | 32  | 64  | 32  | 0   |
| 0   | 0   | 0   | 0   | 0   |
| 0   | -32 | -64 | -32 | 0   |
| -16 | -32 | -32 | -32 | -16 |

FIG. 7

SECONDARY DIFFERENTIAL FILTER
(+ TYPE)

| 0 | 0 | 1  | 0 | 0 |
|---|---|----|---|---|
| 0 | 0 | 0  | 0 | 0 |
| 1 | 0 | -4 | 0 | 1 |
| 0 | 0 | 0  | 0 | 0 |
| 0 | 0 | 1  | 0 | 0 |

FIG. 8

SECONDARY DIFFERENTIAL FILTER
(× TYPE)

| 1 | 0 | 0 | 0 | 1 |
|---|---|---|---|---|
| 0 | 0 | 0 | 0 | 0 |
| 0 | 0 | −4 | 0 | 0 |
| 0 | 0 | 0 | 0 | 0 |
| 1 | 0 | 0 | 0 | 1 |

FIG. 9

EXTERNAL/INTERNAL EDGE
DISCRIMINATING FILTER

| 1 | 0 | 1 | 0 | 1 |
|---|---|---|---|---|
| 0 | 0 | 0 | 0 | 0 |
| 1 | 0 | −8 | 0 | 1 |
| 0 | 0 | 0 | 0 | 0 |
| 1 | 0 | 1 | 0 | 1 |

FIG. 17

−45 DEGREE DIFFERENTIAL FILTER

| 1 | 0 | 0 | 0 | 0 |
|---|---|---|---|---|
| 0 | 0 | 0 | 0 | 0 |
| 0 | 0 | −2 | 0 | 0 |
| 0 | 0 | 0 | 0 | 0 |
| 0 | 0 | 0 | 0 | 1 |

FIG. 18

0 DEGREE DIFFERENTIAL FILTER

| 0 | 0 | 0 | 0 | 0 |
|---|---|---|---|---|
| 0 | 0 | 0 | 0 | 0 |
| 1 | 0 | −2 | 0 | 1 |
| 0 | 0 | 0 | 0 | 0 |
| 0 | 0 | 0 | 0 | 0 |

FIG. 19

+45 DEGREE DIFFERENTIAL FILTER

| 0 | 0 | 0 | 0 | 1 |
|---|---|---|---|---|
| 0 | 0 | 0 | 0 | 0 |
| 0 | 0 | −2 | 0 | 0 |
| 0 | 0 | 0 | 0 | 0 |
| 1 | 0 | 0 | 0 | 0 |

FIG. 20

+90 DEGREE DIFFERENTIAL FILTER

| 0 | 0 | 1 | 0 | 0 |
|---|---|---|---|---|
| 0 | 0 | 0 | 0 | 0 |
| 0 | 0 | −2 | 0 | 0 |
| 0 | 0 | 0 | 0 | 0 |
| 0 | 0 | 1 | 0 | 0 |

FIG. 21

SMOOTHING FILTER

| 1 | 2 | 2 | 2 | 1 |
|---|---|---|---|---|
| 2 | 4 | 4 | 4 | 2 |
| 2 | 4 | 4 | 4 | 2 |
| 2 | 4 | 4 | 4 | 2 |
| 1 | 2 | 2 | 2 | 1 |

FIG. 22 min FILTER

| $a_{11}$ | $a_{12}$ | $a_{13}$ | $a_{14}$ | $a_{15}$ |
|---|---|---|---|---|
| $a_{21}$ | $a_{22}$ | $a_{23}$ | $a_{24}$ | $a_{25}$ |
| $a_{31}$ | $a_{32}$ | $a_{33}$ | $a_{34}$ | $a_{35}$ |
| $a_{41}$ | $a_{42}$ | $a_{43}$ | $a_{44}$ | $a_{45}$ |
| $a_{51}$ | $a_{52}$ | $a_{53}$ | $a_{54}$ | $a_{55}$ |

$a_{33} = \min(a_{11}, a_{12}, a_{13}, a_{14}, a_{15},$
$a_{21}, a_{22}, a_{23}, a_{24}, a_{25},$
$a_{31}, a_{32}, a_{33}, a_{34}, a_{35},$
$a_{41}, a_{42}, a_{43}, a_{44}, a_{45},$
$a_{51}, a_{52}, a_{53}, a_{54}, a_{55})$

IMAGE PROCESSING APPARATUS

This application is based on Application No. 2000-392232 filed in Japan, contents of which is hereby incorporated by reference.

BACKGROUND OF THE INVENTION

1. Field of the Invention

The present invention relates to an image processing apparatus for changing a processing method according to an image attribute. More particularly, the present invention relates to an image processing apparatus capable of precisely detecting a character image in a halftone dot image and applying optimal processing to image data based on the detection result.

2. Description of Related Art

In a digital copying machine or the like for reading an image by using a CCD sensor and decomposing the read image into image pixels, thereby carrying out image processing, an optimal image processing method differs depending on a character image, a photography image, and a halftone dot image. Because of this, in such a digital copying machine or the like, the image attribute is discriminated, whereby the image processing method is changed according to the discrimination result. When the halftone dot image is copied, a moire may occur due to interference between the CCD sensor resolution (sampling frequency) and a document halftone dot frequency. If such a moire occurs, an image quality is degraded. Thus, it is required to precisely discriminate a halftone dot region that exists in the document image, and carrying out image processing such that an occurrence of a moire is restrained.

Conventionally, in an image processing apparatus mounted on a digital copying machine, discrimination in the halftone dot region is carried out. As an example of such discrimination, attention is paid to isolation points (maximum and minimum value points with respect to lightness) which is a characteristic of the halftone dot region, the number of isolation points that exist in a predetermined region is counted, and the discrimination in the halftone dot region is carried out according to the count value of such isolation points. In addition, another discrimination is as follows. After a distance between the halftone dot characteristic points has been computed, in the case where the computation result includes periodicity, it is discriminated that the halftone dot region exists. A smoothing process is applied to a region discriminated to be a halftone dot region, thereby restraining an occurrence of a moire.

However, in the above described conventional image processing apparatus, there has been a problem that a character image in a halftone dot image cannot be reproduced precisely. That is, in the reproduced image, the character image in the halftone dot image blurs, and thus, a reproduced image with its high quality cannot be obtained. This is because the smoothing process is carried out for the halftone dot region, and thus, the smoothing process is applied to the character image in the halftone dot image as well. Namely, although it is required to apply processing for enhancing an edge to a character region, the smoothing process which gives priority to the gradation is applied. Therefore, the character image in the halftone dot image blurs.

SUMMARY OF THE INVENTION

The present invention has been made in order to solve the foregoing problem. It is an object of the present invention to provide an image processing apparatus for precisely detecting a character region in a halftone dot image, and applying optimal processing to each region, thereby making it possible to reproduce a character image in the halftone dot image with high precision.

According to one aspect of the present invention, there is provided an image processing apparatus, comprising: a halftone dot characteristic sampling section that samples a halftone dot characteristic indicative of a characteristic of a halftone dot based on image data; a first counter that counts the number of halftone dot characteristics that exist in a first region including a target pixel from among halftone dot characteristics sampled by the halftone dot characteristic sampling section; an edge pixel sampling section that samples a pixel belonging to an edge region based on image data; a second counter that counts the number of edge pixels that exist in a second region including a target pixel from among edge pixels sampled by the edge pixel sampling section; and a discriminator that discriminates whether or not the target pixel belongs to a character region in a halftone dot image based on the count result of the first counter and the count result of the second counter.

In this image processing apparatus, firstly, a halftone dot characteristic and a pixel (edge pixel) belonging to an edge region are sampled from image data. That is, the halftone dot characteristic indicative of the characteristic of the halftone dot is sampled by a halftone dot characteristic sampling section. In addition, the edge pixel is sampled by an edge pixel sampling section. When the halftone dot characteristic and edge pixel are thus sampled respectively, the number of their respective ones that exist in a predetermined region is then counted. That is, the number of halftone dot characteristics that exist in the first region including the target pixel is counted from among halftone dot characteristics sampled by the halftone dot characteristic sampling section. In addition, by the second counter, the number of edge pixels that exist in the second region including the target pixel is counted from among the edge pixels sampled by the edge pixel sampling section. The first and second regions may be the same in size. When the number of halftone dot characteristics and edge pixels has been counted, the discriminator discriminates whether or not the target pixel belongs to the character region in the halftone dot image based on the count result of the first counter and the count result of the second counter.

At this time, the discriminator may discriminate that the target pixel belongs to the character region in the halftone dot image in the case where the count value of the first counter is smaller than a first threshold and the count value of the second counter is greater than a second threshold. The first threshold and second threshold are thresholds for discriminating the character region in the halftone dot image. In particular, the first threshold is different from a threshold for discriminating a halftone dot region.

The halftone dot region is characterized in that a large number of halftone dot characteristics exist, but a small number of edge pixels exist. In addition, the character region in a halftone dot image is characterized in that a large number of edge pixels exist, but a small number of halftone dot characteristics exist. That is, the halftone dot region and the character region in the halftone dot image are reversed in characteristics. The character region in the halftone dot image can be precisely discriminated by making best use of a difference in their characteristics. Therefore, in the case where the count value of the first counter is smaller than the first threshold, and the count value of the second counter is greater than the second threshold, the discriminator discriminates that the target pixel belongs to the character region in the halftone dot image, thereby making it possible to precisely detect the character region in the halftone dot image.

As has been described above, according to the image processing apparatus of the present invention, the character region in the halftone dot image can be precisely discriminated, and thus, optimal processing can be applied to a respective one of the halftone dot region and character region. Therefore, according to the image processing apparatus of the present invention, the character image in the halftone dot image can be reproduced with high precision.

In the image processing apparatus according to the present invention, it is desirable that the edge pixel sampling section contain an edge detector that detects an edge quantity, and samples an internal edge pixel such that a positive edge detection quantity has been detected by the edge detector.

This is from following reason. The internal edge pixel indicates an edge at the inside of a character. Thus, it is possible to identify whether the character is a black character or a color character. By detecting the internal edge pixel, it is possible to identify whether the character is a black character or a color character, and optimal processing can be applied to a respective one of the black and color characters. In addition, if an image noise formed of a small number of pixels occurs, an external edge pixel is easily detected, and the internal edge pixel is hardly detected. Thus, if edge enhancement processing is applied to the external edge pixel after detected, the image noise is enhanced, causing degradation of an image quality. In order to avoid such a circumstance, it is preferable that the internal edge pixel be detected.

According to another aspect of the present invention, there is provided an image processing apparatus comprising: a first discrimination unit that discriminates whether or not each pixel of image data is a halftone dot characteristic indicative of a characteristic of a halftone dot image by using a first filter; a second discrimination unit that discriminates whether or not each pixel of image data is a pixel that belongs to an edge region by using a second filter; a first counter that counts the number of halftone dot characteristics that exist in a first pixel matrix consisting of a plurality of pixels containing a target pixel based on the discrimination result of the first discrimination unit; a second counter that counts the number of edge pixels that exist in a second pixel matrix consisting of a plurality of pixels containing a target pixel based on the discrimination result of the second discrimination unit; a discrimination unit that discriminates whether or not a target pixel belongs to a character region in a halftone dot image based on the count result of the first counter and the count result of the second counter; and an image processing unit that processes image data based on the discrimination result of the discrimination unit.

This image processing apparatus as well carries out processing that is basically identical to the above described image processing apparatus. That is, the discrimination unit discriminates whether or not the target pixel belongs to the character region in the halftone dot image based on the count result of the first counter (number of halftone dot characteristics) and the count result of the second counter (number of edge pixels). Then, an image processing unit processes image data based on the discrimination result of the discrimination unit. Therefore, the character region in the halftone dot image is precisely judged, and thus, optimal processing can be applied to a respective one of the halftone dot region and character region. That is, according to the image processing apparatus of the present invention, the character image in the halftone dot image can be reproduced with high precision.

According to another aspect of the present invention, there is provided an image processing method comprising: a step 1 of discriminating whether or not each pixel of image data is a halftone dot characteristic indicative of a characteristic of a halftone dot image and discriminating whether or not each pixel of image data is an edge pixel that belongs to an edge region; a step 2 of counting the number of halftone dot characteristics that exist in a first pixel matrix consisting of a plurality of pixels including a target pixel based on the discrimination result in the step 1 and counting the number of edge pixels that exist in a second pixel matrix consisting of a plurality of pixels including the target pixel; a step 3 of discriminating whether or not a target pixel belongs to a character region in a halftone dot image based on the number of halftone dot characteristics and the number of edge pixels counted in the step 2; and a step 4 of processing image data based on the discrimination result in the step 3.

In this image data processing method, firstly, in the step 1, it is discriminated whether or not each pixel of image data is a halftone dot characteristic indicative of a characteristic of a halftone dot image, and it is discriminated whether or not each pixel of image data is an edge pixel that belongs to an edge region. Then, in the step 2, based on the discrimination result in the step 1, the number of halftone dot characteristics that exist in the first pixel matrix consisting of a plurality of pixels including a target pixel is counted, and the number of edge pixels that exists in the second pixel matrix consisting of a plurality of pixels including the target pixel is counted. Next, in the step 3, it is discriminated whether or not the target pixel belongs to the character region in the halftone dot image based on the numbers of halftone dot characteristics and edge pixels counted in the step 2. Then, in the step 4, image data is processed based on the discrimination result in the step 3.

As has been described above, according to the data processing method of the present invention, as in the above described image forming device, it is discriminated whether or not the target pixel belongs to the character region in the halftone dot image based on the number of halftone dot characteristics and the number of edge pixels. Then, image data is processed based on the discrimination result. Because of this, the character region in the halftone dot image is precisely judged, and thus, optimal processing can be applied to a respective one of the halftone dot region and character region. Therefore, according to the image processing method of the present invention, the character image in the halftone dot image can be reproduced with high precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF DRAWINGS

For a better understanding of the present invention, reference is made to the following detailed description of the invention, just in conjunction with the accompanying drawings in which:

FIG. 5 is a view showing a primary differential filter (main scanning direction);

FIG. 6 is a view showing a primary differential filter (sub-scanning direction);

FIG. 7 is a view showing a secondary differential filter (+ type);

FIG. 8 is a view showing a secondary differential filter (x type);

FIG. 9 is a view showing an external/internal edge discriminating filter;

FIG. 17 is a view showing a −45 degree differential filter;

FIG. 18 is a view showing a 0 degree differential filter;

FIG. 19 is a view showing a +45 degree differential filter;

FIG. 20 is a view showing a +90 degree differential filter;

FIG. 21 is a view showing a smoothing filter;

FIG. 22 is a view showing a min filter; and

DETAILED DESCRIPTION OF PREFERRED EMBODIMENTS

Figure 1:
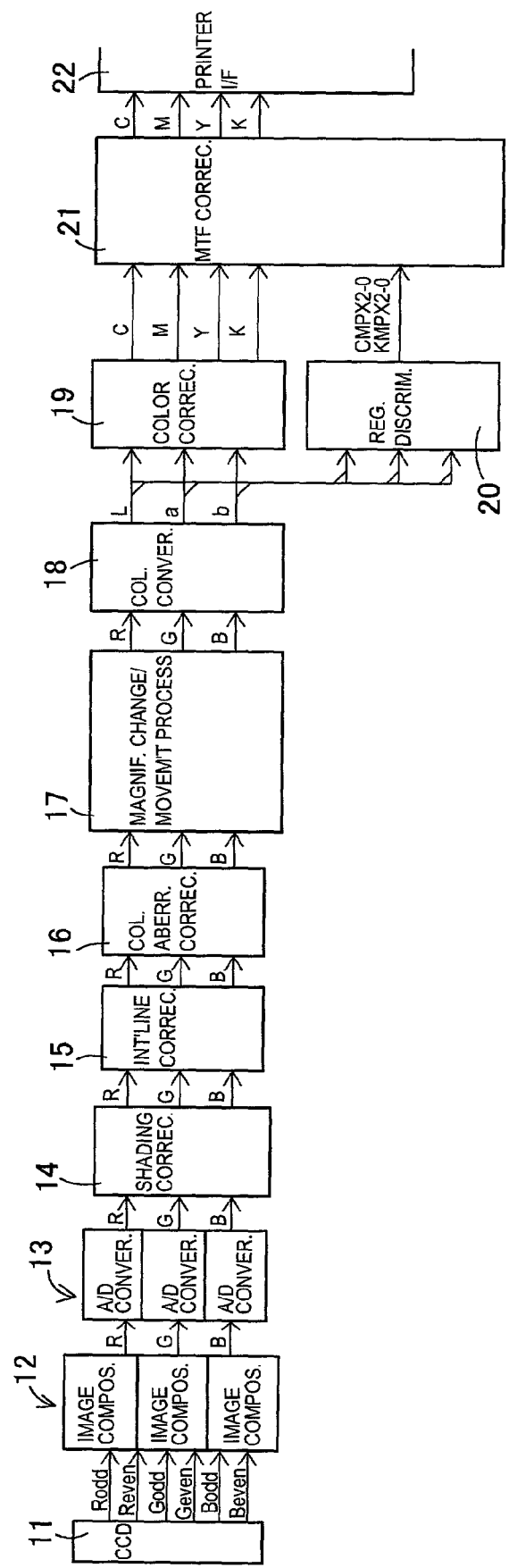
FIG. 1 is a block diagram depicting a schematic construction of a color image processing apparatus according to one embodiment of the present invention.

Reference will now be made in detail to the presently preferred embodiments of the invention as illustrated in the accompanying drawings, in which like reference numerals designate like or corresponding parts.

Hereinafter, the best mode embodying an image processing apparatus according to the present invention will be described in detail with reference to the accompanying drawings. According to the present embodiment, the present invention is applied to a color image processing apparatus. In the present embodiment, a halftone dot internal character denotes a character image drawn in a halftone dot image expressed by halftone dots, a background of which is expressed by halftone dots. In addition, a halftone dot internal character region denotes a region of a character image drawn in the halftone dot image.

A schematic construction of a color image processing apparatus according to the present embodiment is shown in FIG. 1. This color image processing apparatus comprises: a CCD sensor 11; an image composing section 12; an A/D converting section 13; a shading correcting section 14; an interline correcting section 15 that carries out correction between lines; a color aberration correcting section 16 that corrects a color aberration of each color; a magnification change/movement processing section 17; a color converting section 18; a color correcting section 19; a region discriminating section 20; an MTF correcting section 21; and a printer interface (I/F) 22.

The CCD sensor 11 receives reflection light obtained by scanning a document with a scanner, converts the obtained light in a photoelectric manner, and acquires an analog RGB signal. The image composing section 12 composes an odd (odd numbered component) and even (even numbered component) with each other relevant to a respective one of the analog RGB signals acquired by the CCD sensor 11. The A/D converting section 13 converts the analog RGB signal composed by the image composing section 12 into a digital signal. The image composing section 12 and A/D converting section 13 are provided for a respective one of the RGB signals.

The shading correcting section 14 eliminates non-uniformity of light quantity in the main scanning direction on an image. Specifically, prior to document reading operation, the reflection light from a white plate for shading correction is received by the CCD sensor 11, the obtained analog data is converted into digital data, and the digital data is stored in a memory. During document reading, the document read data is corrected while the digital data stored in the memory is defined as a reference value.

The magnification change/movement processing section 17 controls memory write and readout operations, thereby carrying out enlargement/reduction processing in the main scanning direction of an image and image movement processing. The color converting section 18 converts a current color into a specified display color system, wherein Lab data is produced based on the RGB signal. Then, the Lab data produced at the color converting section 18 is inputted to the color correcting section 19 and region discriminating section 20. The color correcting section 19 produces a recording density signal CMYK which can be recorded by a desired color considering spectroscopy characteristics of an actually used four-color toner and a recording process based on the Lab data.

Figure 2:
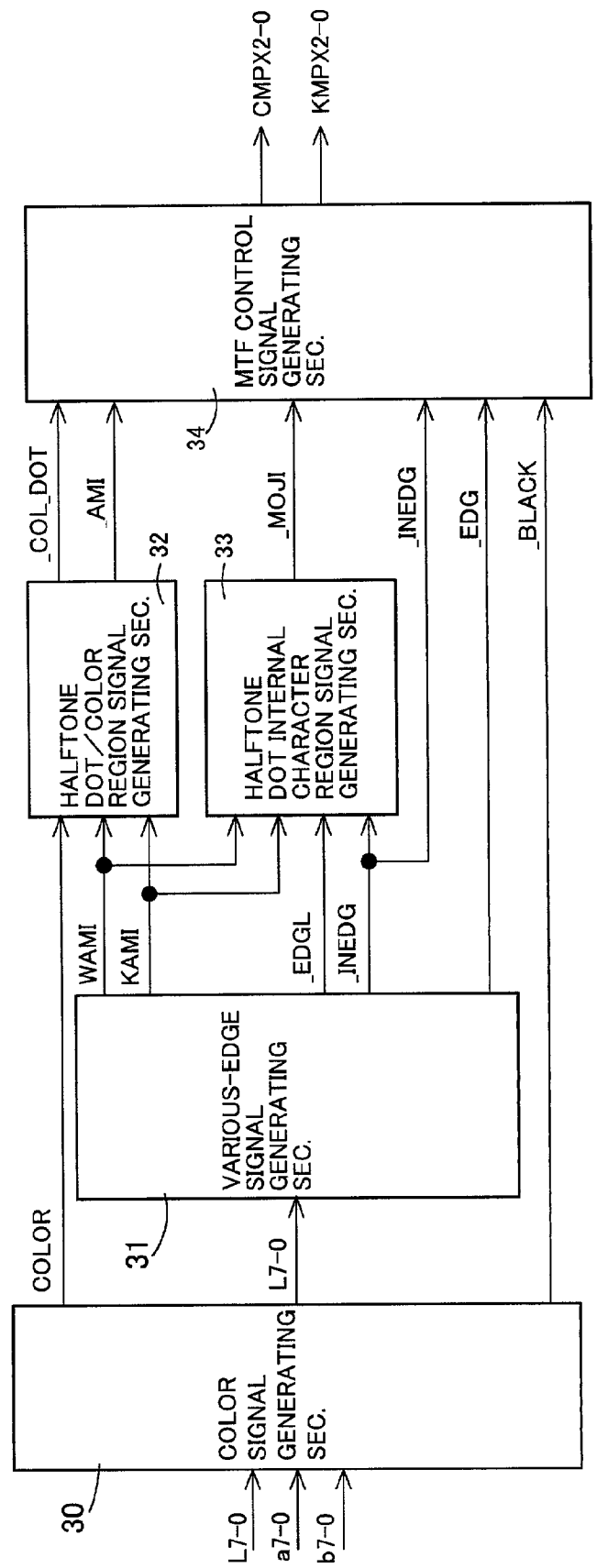
FIG. 2 is a block diagram depicting a schematic construction of a region discriminating portion shown in FIG. 1.

The region discriminating section 20 discriminates an image attribute for each pixel, generates signals that correspond to each attribute so as to finally generate a control signal (CMPX, KMPX) for an MTF correcting section 21 based on these signals. This region discriminating section 20 comprises a color signal generating section 30, a various-edge signal generating sections 31, a halftone dot/color region signal generating section 32, a halftone dot internal character region signal generating section 33, and an MTF control signal generating section 34 as shown in FIG. 2.

Figure 3:
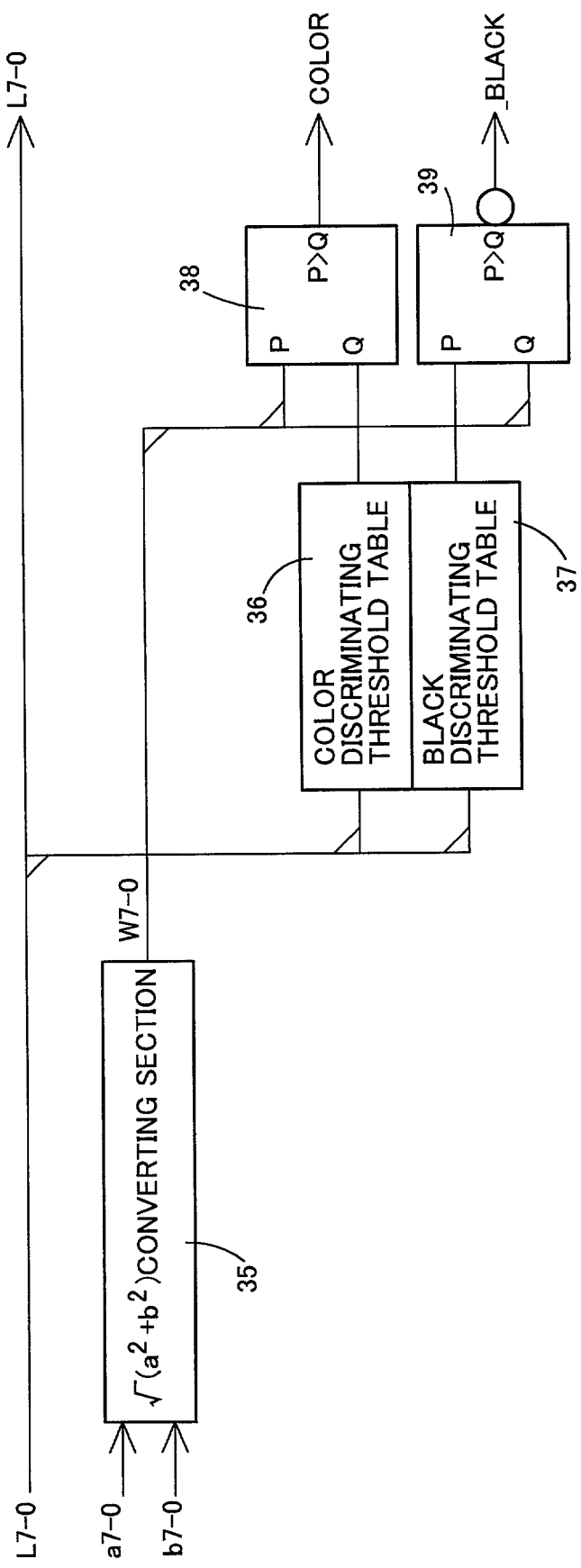
FIG. 3 is a block diagram depicting a schematic construction of a color signal generating section in FIG. 2.

The color signal generating section 30 generates a color signal (COLOR) and a black region signal (_BLACK) based on the Lab data generated at the color converting section 18. The color signal generating section 30 is composed of a converting section 35, a color discriminating threshold table 36, and a black discriminating threshold table 37, and two comparators 38 and 39, as shown in FIG. 3.

The converting section 35 generates saturation data (W7-0) in accordance with a conversion formula ($\sqrt{(a^2+b^2)}$) using data (a7-0, b7-0) generated at the color converting section 18. The color discrimination threshold table 36 generates a threshold for generating a color signal (COLOR) based on the lightness data (L7-0). In addition, the black discrimination threshold table 37 generates a threshold for generating a black region signal (_BLACK) based on lightness data (L7-0). The thresholds for generating the color signal (COLOR) and black region signal (_BLACK) are generated based on the lightness data (L7-0) because the saturation quantity non-linearly depends on the lightness.

With a construction, the color signal generating section 30 compares the saturation data (W7-0) with the threshold generated by the color discrimination threshold table 36 in a comparator 38, thereby generating a color signal (COLOR). In addition, in a comparator 39, this section compares the saturation data (W7-0) with the threshold generated by the black discrimination threshold table 37, thereby generating a black region signal (_BLACK).

Figure 4:
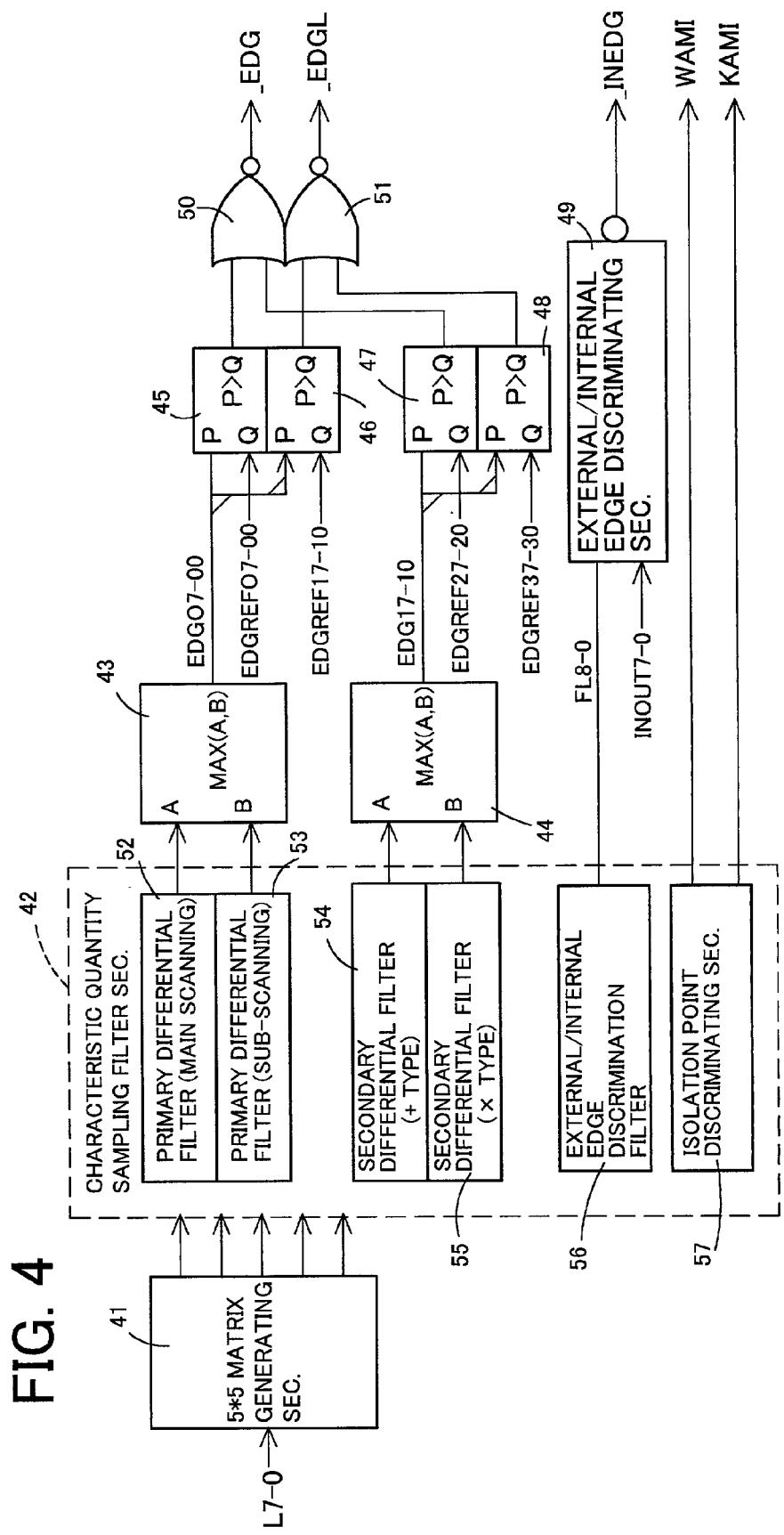
FIG. 4 is a block diagram depicting a schematic construction of a various-edge signal generating sections shown in FIG. 2.

Turning to FIG. 2, the various-edge signal generating section 31 generates a halftone dot discrimination isolation point signal (WAMI, KAMI), a halftone dot internal character region detection edge signal (_EDGL), a halftone dot internal character region detection internal edge signal (_INEDG), and a character edge region signal (_EDG) based on the lightness data (L7-0). Then, in order to generate these signals, the various-edge signal generating section 31 includes: a matrix generating section 41; a characteristic quantity sampling filter section 42; two selectors 43 and 44; four comparators 45 to 48; an external/internal edge discriminating section 49; two OR circuits 50 and 51, as shown in FIG. 4.

The matrix generating section 41 generates matrix data of 5×5 pixel size from input image data. Then, filter processing caused by the characteristic quantity sampling filter 42 is applied to matrix data generated at the matrix generating section 41. The characteristic quantity sampling filter section 42 comprises: primary differential filters (main scanning direction and sub-scanning direction) 52 and 53; secondary differential filters (+type and x type) 54 and 55; an external/internal edge discriminating filter 56; and an isolation point detecting filter 57. In the present embodiment, the primary differential filter 52 in the main scanning direction shown in FIG. 5 is used, and the primary differential filter 53 in the sub-scanning direction shown in FIG. 6 is used. In addition, the + type secondary differential filter 54 shown in FIG. 7 is used, and the x type secondary differential filter 55 shown in FIG. 8 is used. Further, the external/internal edge discriminating filter 56 shown in FIG. 9 is used.

Figure 10:
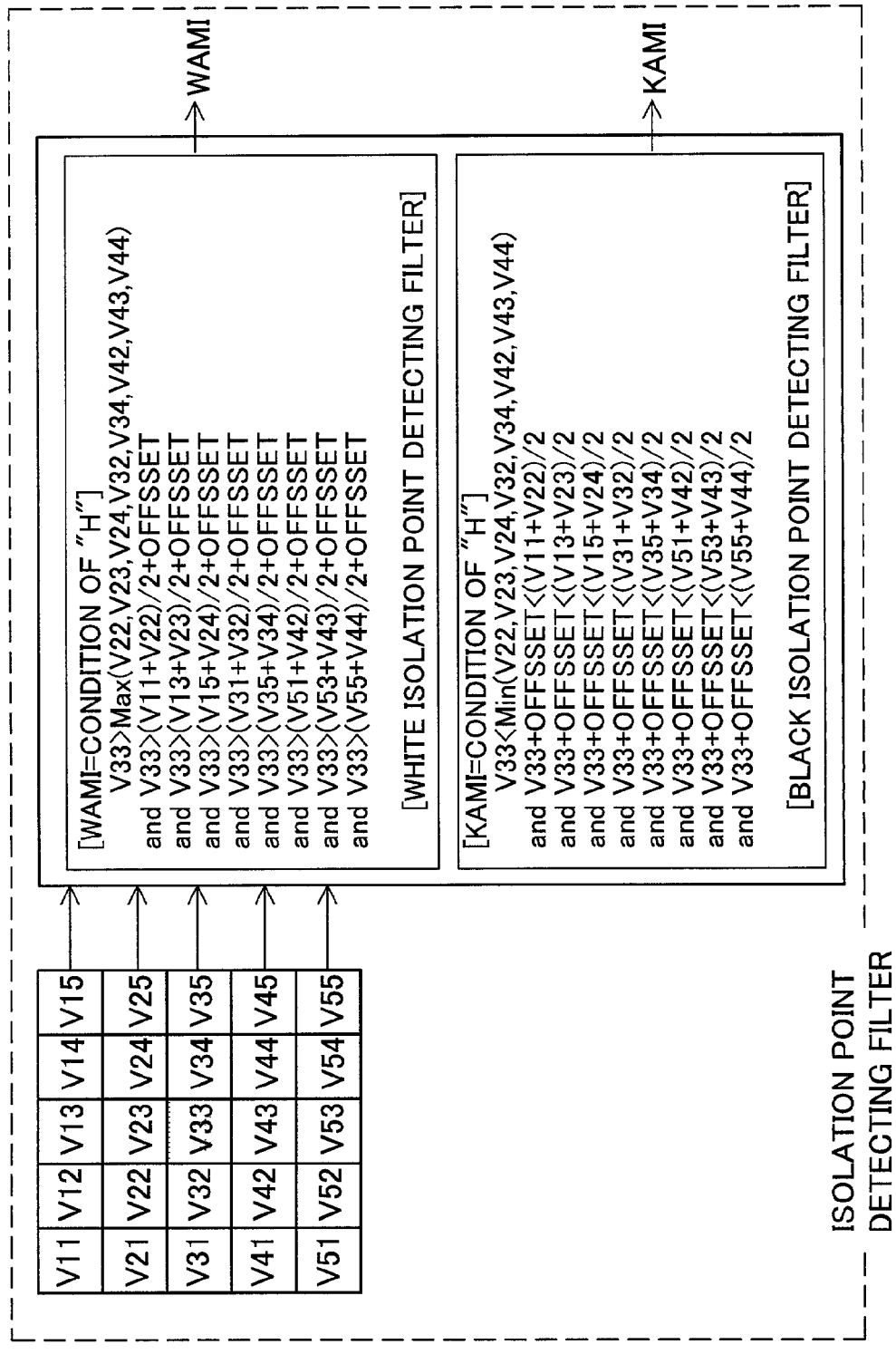
FIG. 10 is a view showing an isolation point detection filter.

Furthermore, the isolation point detecting filter 57 shown in FIG. 10 is used. This isolation point detecting filter 57 includes a white isolation point detecting filter 57a and a black isolation point detecting filter 57b. In the case where the lightness value of a target pixel V33 is greater than that of the peripheral eight pixels, and is greater than the average lightness value of two pixels in eight directions, the white isolation point detecting filter 57a detects that the halftone dot discrimination isolation point signal (WAMI) is "H" active.

Namely, in the case where the lightness value of the target pixel V33 meets the following condition, it is discriminated that the target pixel V33 is a white isolation point (WAMI="H"). In this case, all of the conditions indicated below must be satisfied:
V33>MAX (V22, V23, V24, V32, V34, V42, V43, V44); and
V33>(V11+V22)/2+OFFSET; and
V33>(V13+V23)/2+OFFSET; and
V33>(V15+V24)/2+OFFSET; and
V33>(V31+V32)/2+OFFSET; and
V33>(V35+V34)/2+OFFSET; and
V33>(V51+V42)/2+OFFSET; and
V33>(V53+V43)/2+OFFSET; and
V33>(V55+V44)/2+OFFSET.

In addition, in the case where the lightness value of the target pixel V33 is smaller than that of the periphery eight pixels, and is smaller than the average lightness value of two pixels in eight directions, the black isolation point detecting filter 57b detects that the halftone dot discrimination isolation point signal (KAMI) is "H" active.

Namely, in the case where the lightness value of the target pixel V33 meets the following condition, it is discriminated that the target pixel V33 is a black isolation point (KAMI="H"). In this case, all of the conditions indicated below must be satisfied:
V33<MIN (V22, V23, V24, V32, V34, V42, V43, V44); and
V33+OFFSET<(V11+V22)/2; and
V33+OFFSET<(V13+V23)/2; and
V33+OFFSET<(V15+V24)/2; and
V33+OFFSET<(V31+V32)/2; and
V33+OFFSET<(V35+V34)/2; and
V33+OFFSET<(V51+V42)/2; and
V33+OFFSET<(V53+V43)/2; and
V33+OFFSET<(V55+V44)/2.

OFFSET is a threshold for discriminating an isolation point.

Turning to FIG. 4, an output from the primary differential filter 52 in the main scanning direction is inputted to terminal A of the selector 43, and an output from the primary differentia filter 53 in the sub-scanning direction is outputted to terminal B of the selector 43. In addition, an output from the + type secondary differential filter 54 is inputted to terminal A of the selector 44, and an output from the x type secondary differential filter 55 is inputted to terminal B of the selector 44. In the selectors 43 and 44 each, a greater one of the values inputted to terminals A and B is selected and outputted.

In addition, an output (EDG07-00) from the selector 43 is inputted to terminal P of the comparator 45, and an edge reference value (EDGREF07-00) is inputted to terminal Q of the comparator 45. Similarly, an output (EDG07-00) from the selector 43 is inputted to terminal P of the comparator 46, an edge reference value (EDGREF17-10) is inputted to terminal Q of the comparator 46. On the other hand, an output (EDG17-10) from the selector 44 is inputted to terminal P of the comparator 47, and an edge reference value (EDGREF27-20) is inputted to terminal Q of the comparator 47. Similarly, an output (EDG17-10) from the selector 44 is inputted to terminal P of the comparator 48, and an edge reference value (EDGREF37-30) is inputted to terminal Q of the comparator 48.

An output of the comparator 45 and that of the comparator 47 are inputted to an OR circuit 50. In addition, an output of the comparator 46 and that of the comparator 48 are inputted to an OR circuit 51. With the above construction, in the OR circuit 50, in the case where any of the following conditions (1) and (2) is met, a character edge region signal (_EDG) is set to "L" active. The conditions include: (1) a case in which the maximum value of values filtered by the primary filter 52 in the main scanning direction and the primary filter 53 in the sub-scanning direction is greater than an edge reference value (EDGREF07-00); and (2) a case in which the maximum value of values filtered by the + type secondary differential filter 54 and x type secondary differential filter 55 is greater than an edge reference value (EDGREF27-20).

Similarly, in the OR circuit 51, in the case where any of the following conditions (3) and (4) is met, a halftone dot internal character region detection edge signal (_EDGL) is set to "L" active. The conditions include: (3) a case in which the maximum value of values filtered by the primary filter 52 in the main scanning direction and the primary filter 53 in the sub-scanning direction is greater than an edge reference value (EDGREF17-10); and (4) a case in which the maximum value of values filtered by the + type secondary differential filter 54 and x type secondary differential filter 55 is greater than an edge reference value (EDGREF37-30).

Figure 11:
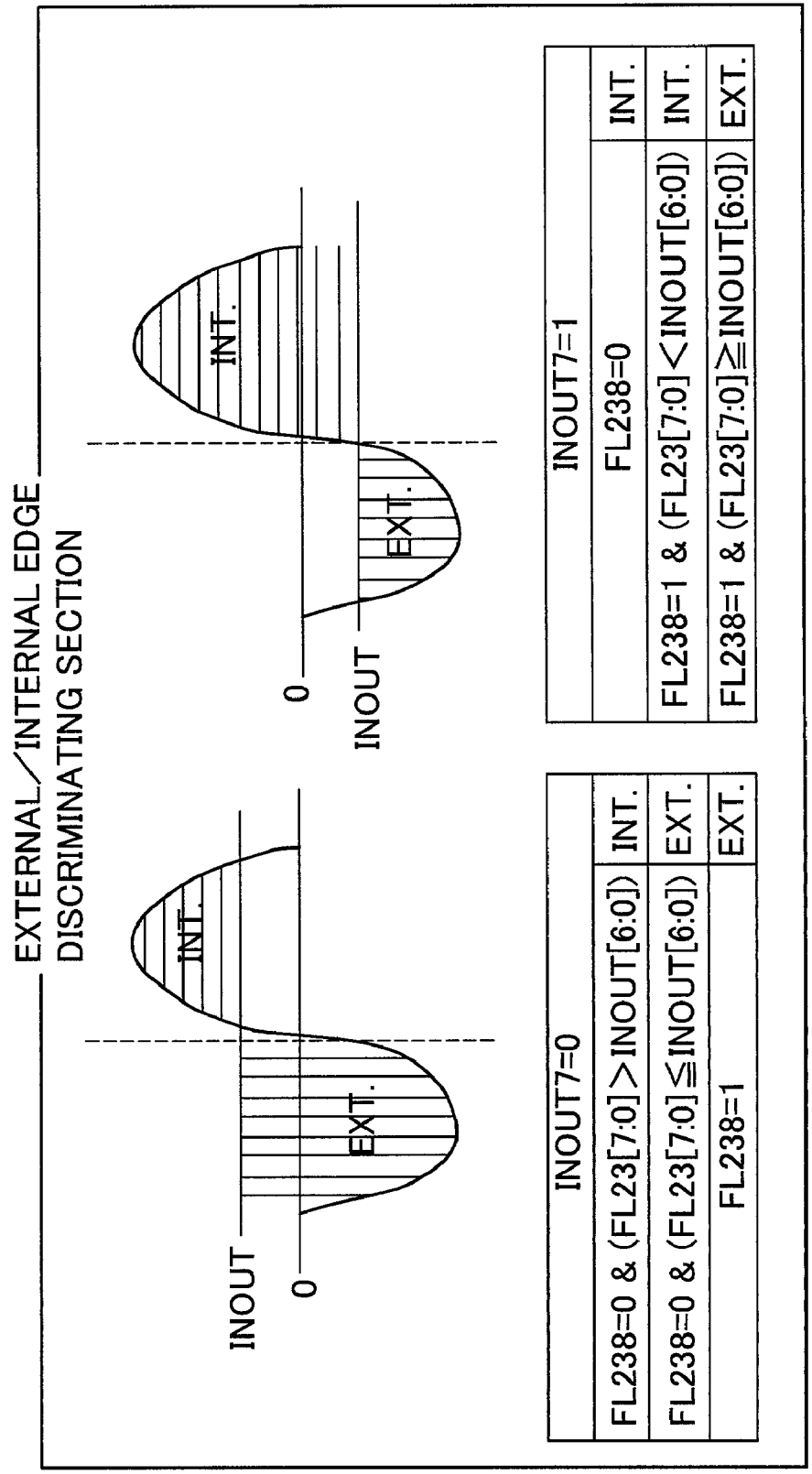
FIG. 11 is a view illustrating a discrimination method in the external/internal edge discriminating section in FIG. 4.

The value filtered by the external/internal edge discriminating filter 56 and the discrimination reference value (INOUT7-0) are inputted to the external/internal edge discriminating section 49. In the external/internal edge discriminating section 49, the external/internal edge is discriminated as shown in FIG. 11. That is, when INOUT7=0 is satisfied, where the edge detection quantity is set to a positive value (FL238=0) and is greater than a threshold (INOUT6-0), it is discriminated as an internal edge. In addition, in the case where the edge detection quantity is set to a positive value (FL238=1) and is smaller than the threshold (INOUT6-0), or alternatively, where the edge detection quantity is set to a negative value (FL238=1), it is discriminated as an external edge. On the other hand, when INOUT7=1 is satisfied, where the edge detection quantity is set to a positive value (FL238=0), or alternatively, where the edge detection quantity is set to a negative value (FL238=1) and is smaller than the threshold (INOUT6-0), it is discriminated as an internal edge. In addition, in the case where the edge detection quantity is set to a negative value (FL238=1) and is greater than the threshold (INOUT6-0), it is discriminated as an external edge. Where the external/internal edge discriminating section 49 discriminates a target to be an internal edge, the halftone dot internal character region detection internal edge signal (_IN-EDG) is set to "L" active. The threshold (INOUT6-0) and edge detection quantity (FL237-230) indicates an absolute value.

Figure 12:
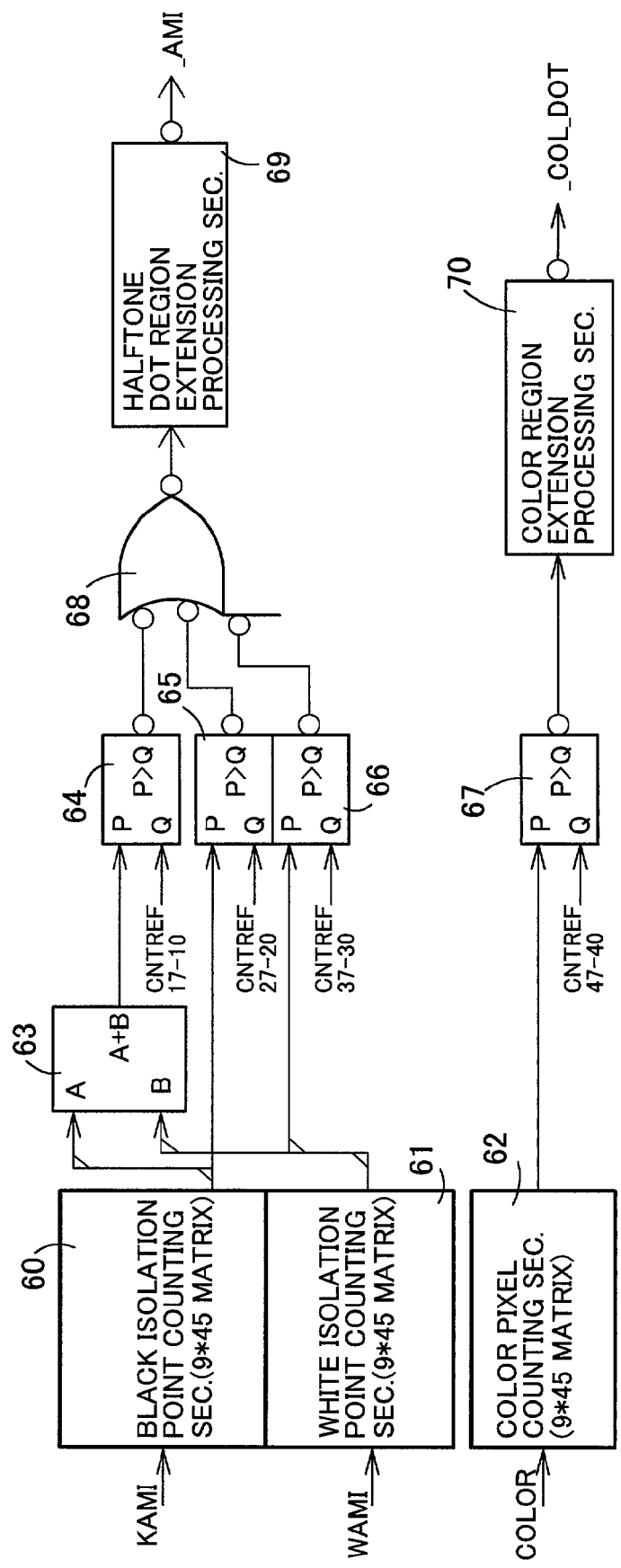
FIG. 12 is a block diagram depicting a schematic construction of a halftone dot/color region signal generating section in FIG. 2.

Turning to FIG. 2 again, the halftone dot/color region signal generating section 32 generates a color region signal (_COL_DOT) and a halftone dot region signal (_AMI) based on the color signal (COLOR) and halftone dot discrimination isolation point signal (WAMI, KAMI). That is, the halftone dot/color region signal generating section 32 discriminates whether it is halftone dot region or a color region. In the case that the halftone dot/color region signal generating section 32 activates both a color region signal (_COL_DOT) and a halftone dot region signal (_AMI) to a pixel, it is discriminated that the pixel belongs to color halftone dot region in the region discriminating section 20. This halftone dot/color region signal generating section 32 includes: a black isolation point counting section 60; a white isolation point counting section 61; a color pixel counting section 62; an adder 63; four comparators 64 to 67; an OR circuit 68; a halftone dot region extension processing section 69; and a color region extension processing section 70, as shown in FIG. 12.

The black isolation point counting section 60 counts the number of black isolation points that exist in a 9×45 pixel matrix region. Similarly, the white isolation point counting section 61 counts the number of white isolation points that exist in a 9×45 pixel matrix region. Outputs from the black isolation point counting section 60 are inputted to terminal A of the adder 63 and terminal P of the comparator 65, respectively. On the other hand, outputs from the white isolation point counting section 61 are inputted to terminal B of the adder 63 and terminal P of the comparator 66, respectively. In addition, an output from the adder 63 is inputted to terminal P of the comparator 64. Reference values (CNTREF17-10, 27-20, and 37-30) are inputted to terminals P of comparators 64 to 66. In addition, outputs from the comparators 64 to 66 are inputted to an OR circuit 68.

In an OR circuit 68, if there is met at least one of the conditions wherein a total number of black and white isolation points is greater than the reference value (CNTREF17-10); the number of black isolation points is greater than the reference value (CNTREF27-20); and the number of white isolation points is greater than the reference value (CNTREF37-30), it is discriminated that the target pixel belongs to a halftone dot region. Then, the halftone dot region signal (_AMI) is set to "L" active. Then, region expansion processing caused by a halftone dot region extension processing section 69 is applied to the halftone dot region signal (_AMI).

Figure 13:
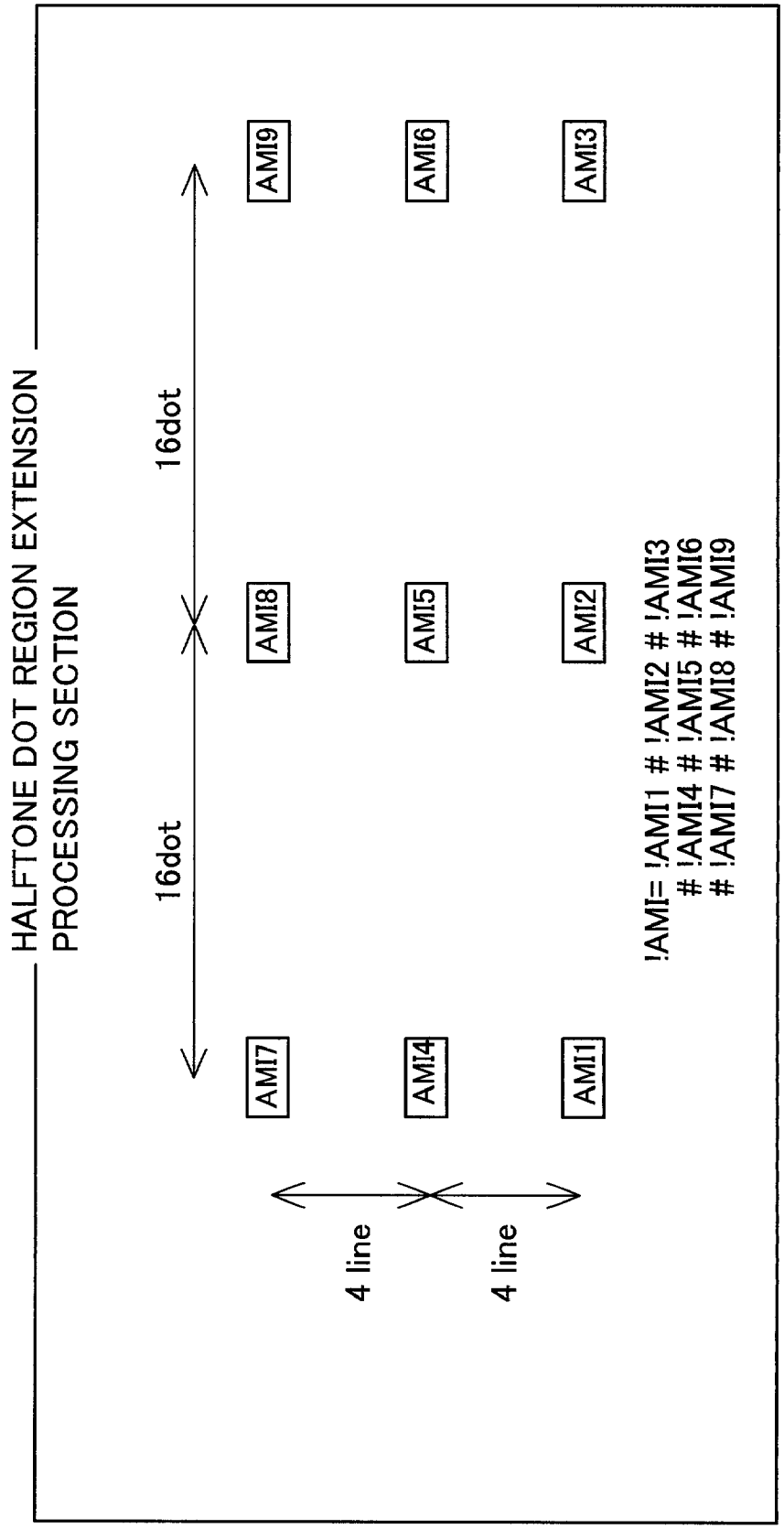
FIG. 13 is a view illustrating the processing content at a halftone dot region extension processing section shown in FIG. 12.

In the halftone dot region extension processing section 69, as shown in FIG. 13, if any of the pixels (AMI1 to AMI9) corresponding to a position distant by 16 halftone dots in the main scanning direction and by four lines in the sub-scamming direction relevant to the target pixel (AMI5), AMI5 is defined as a halftone dot point irrespective of whether or not AMI5 is a halftone dot, thereby carrying out extension processing of the halftone dot region. Specifically extension processing is carried out in accordance with the formula below:

!AMI=!AMI1#!AMI2#!AMI3#!AMI4 #!AMI5#!AMI6#!AMI7#!AMI8#!AMI9 wherein "!" denotes inversion processing, and "#" denotes OR processing, respectively.

A halftone dot region is thus extended at the halftone dot region extension processing section 69, whereby the number of isolation points can be prevented from being decreased at a boundary between a halftone dot region and a solid region. Thus, the halftone dot region can be precisely discriminated.

In addition, the color pixel counting section 62 counts the number of color pixels that exist in a 9×45 pixel matrix region. An output from the color pixel counting section 62 is inputted to terminal P of the comparator 67. A reference value (CNTREF47-40) is inputted to terminal Q of the comparator 67. In this manner, in the case where the number of color pixels is greater than the reference value (CNTREF47-40), the comparator 67 discriminates that the target pixel is a color pixel, and a color region signal (_COL_DOT) is set to "L" active. Then, region extension processing caused by a color region extension processing section 70 is applied to the color region signal (_COL_DOT). The region extension processing at the color region extension processing section 70 is carried out in the same manner as that at a halftone dot region extension processing section 69.

The color region is thus extended at the color region extension processing section 70, whereby the number of color pixels can be prevented from being decreased at a boundary between the color region and the black character region. Thus, the color region can be precisely discriminated.

Figure 14:
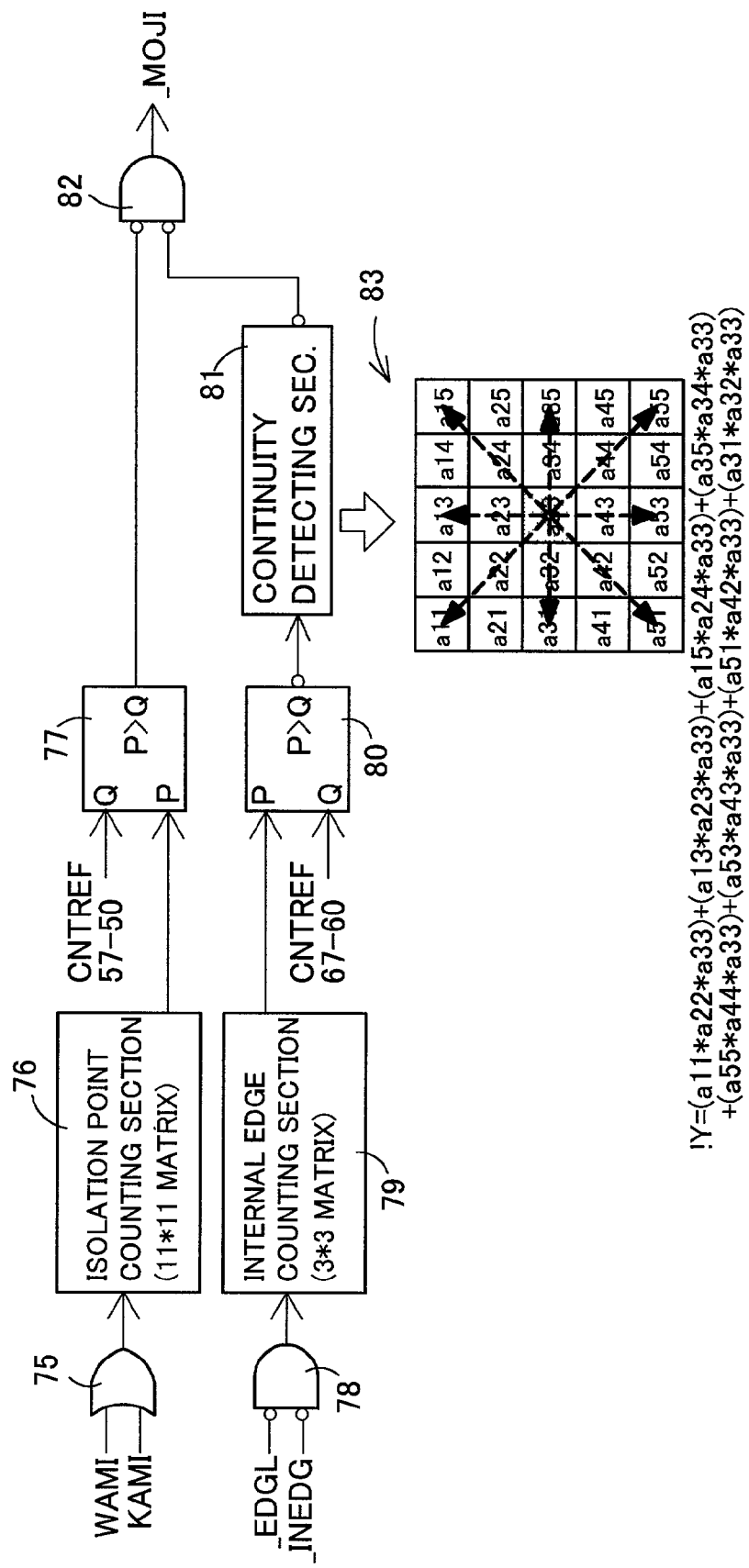
FIG. 14 is a block diagram depicting a schematic construction of a halftone dot internal character region signal generating section shown in FIG. 2.

Turning to FIG. 2, the halftone dot internal character region signal generating section 33 generates a halftone dot internal character region signal (_MOJI) based on the halftone dot discrimination isolation signals (WAMI, KAMI), a halftone dot internal character region detection edge signal (_EDGL), and a halftone dot internal character region detection internal edge signal (_INEDG). That is, the half tone dot internal character region signal generating section 33 discriminates a halftone dot internal character region from other types of regions. This halftone dot internal character region signal generating section 33 includes: an OR circuit 75; two AND circuits 78 and 82; an isolation point counting section 76; an internal edge counting section 79; two comparators 77 and 88; and a continuity detecting section 81, as shown in FIG. 14.

The isolation point counting section 76 counts the number of isolation points that exist in an 11×11 pixel matrix region. A signal from the OR circuit 75, i.e., a signal indicative of whether or not an isolation point exists relevant to each pixel, is inputted to the isolation point counting section 76. This signal is held by an 11×11 pixel matrix whose center is the target pixel, and the pixels corresponding to the isolation point are counted. In addition, the internal edge counting section 79 counts the number of internal edge pixels that exists in a 3×3 pixel matrix region. A signal from the AND circuit 78, i.e., a signal indicative of whether or not a pixel belongs to an internal edge region that is a part of an edge region, is inputted to the internal edge counting section 79 with respect to each pixel. This signal is held by a 3×3 pixel matrix whose center is the target pixel, and the pixels belonging to the internal edge region that is a part of edge region are counted. Further, the continuity detecting section 81 detects the continuity of the internal edge, namely, whether or not the pixels belonging to the internal edge region continuously exist.

The halftone dot discrimination isolation point signals (WAMI, KAMI) are inputted to the OR circuit 75. Thus, the OR circuit 75 computes a logical sum between WAMI and KAMI. The computation result is inputted to the isolation point counting section 76. Further, an output from the isolation point counting section 76 is inputted to terminal P of the comparator 77. On the other hand, a reference value (CNTREF57-50) is inputted to terminal Q of the comparator 77.

In addition, a halftone dot internal character region detection edge signal (_EDGL) and a halftone dot internal character region detection internal edge signal (_INEDG) are inputted to the AND circuit 78. The AND circuit 78 computes a logical product between _EDGL and _INEDG. Then, the computation result is inputted to the internal edge counting section 79. Further, an output from the internal edge counting section 79 is inputted to terminal P of the comparator 80. On the other hand, a reference value (CNTREF67-60) is inputted to terminal Q of the comparator 80.

An output from the comparator 80 is inputted to the continuity detecting section 81. At this continuity detecting section 81, with respect to matrix data 83 of 5×5 pixel size in which a target pixel a33 is positioned at its center, it is detected whether or not three continuous pixels whose logic is the same as that of the target pixel a33 exist in any of the shown eight directions, whereby the continuity of the internal edges is detected. Specifically, the continuity of the internal edges is detected in accordance with the formula below.

!Y=(a11 x a22 x a33)+(a13 x a23 x a33)+(a15 x a24 x a33)+(a35 x a34 x a33)+(a55 x a44 x a33)+(a53 x a43 x a33)++(a51 x a42 x a33)+(a31 x a32 x a33)

where "!" denotes inversion processing, "x" denotes AND processing, and "+" denotes OR processing, respectively.

In this way, at the continuity detecting section 81, the continuity of the internal edges is detected, and the detection result is taken into consideration, thereby making it possible to prevent image noise or the like from being incorrectly discriminated as a character region in a halftone dot. That is, the character region in the halftone dot can be discriminated more precisely.

Finally, an output from the comparator 77 and an output from the continuity detecting section 81 are inputted to the AND circuit 82, and an output from the AND circuit 82 is obtained as an output of the halftone dot internal character region signal generating section 33. With such a construction, at the halftone dot internal character region signal generating section 33, in the case where it is judged that the count value of isolation points is smaller than a reference value (CNTREF57-50), the count value of internal edges is greater than a reference value (CNTREF67-60), and further, the internal edges are continuous, the target pixel is judged as belonging to the halftone dot internal character region. At the halftone dot internal character region signal generating section 33, in the case where it is judged that the target pixel belongs to the halftone dot internal character region, the halftone dot internal character region signal (_MOJI) is set to "L" active.

Turning to FIG. 2 again, the MTF control signal generating section 34 generates an MTF control signal (CMPX2-1, KMPX2-0) that controls an operation of the MTF control section 21 based on a color region signal (_COL_DOT), a halftone dot region signal (_AMI), a halftone dot internal character region signal (_MOJI), and a halftone dot internal character region detection internal edge signal (_INEDG), character edge region signal(_EDG), and black region signal (_BLACK). This MTF control signal generating section 34 is composed of a lookup table so as to generate an MTF control signal (CMPX, KMPX) while six region discrimination attribute signals (_COL_DOT, _AMI, _MOJI, _INEDG, _EDG, _BLACK) are defined as input addresses.

Figure 15:
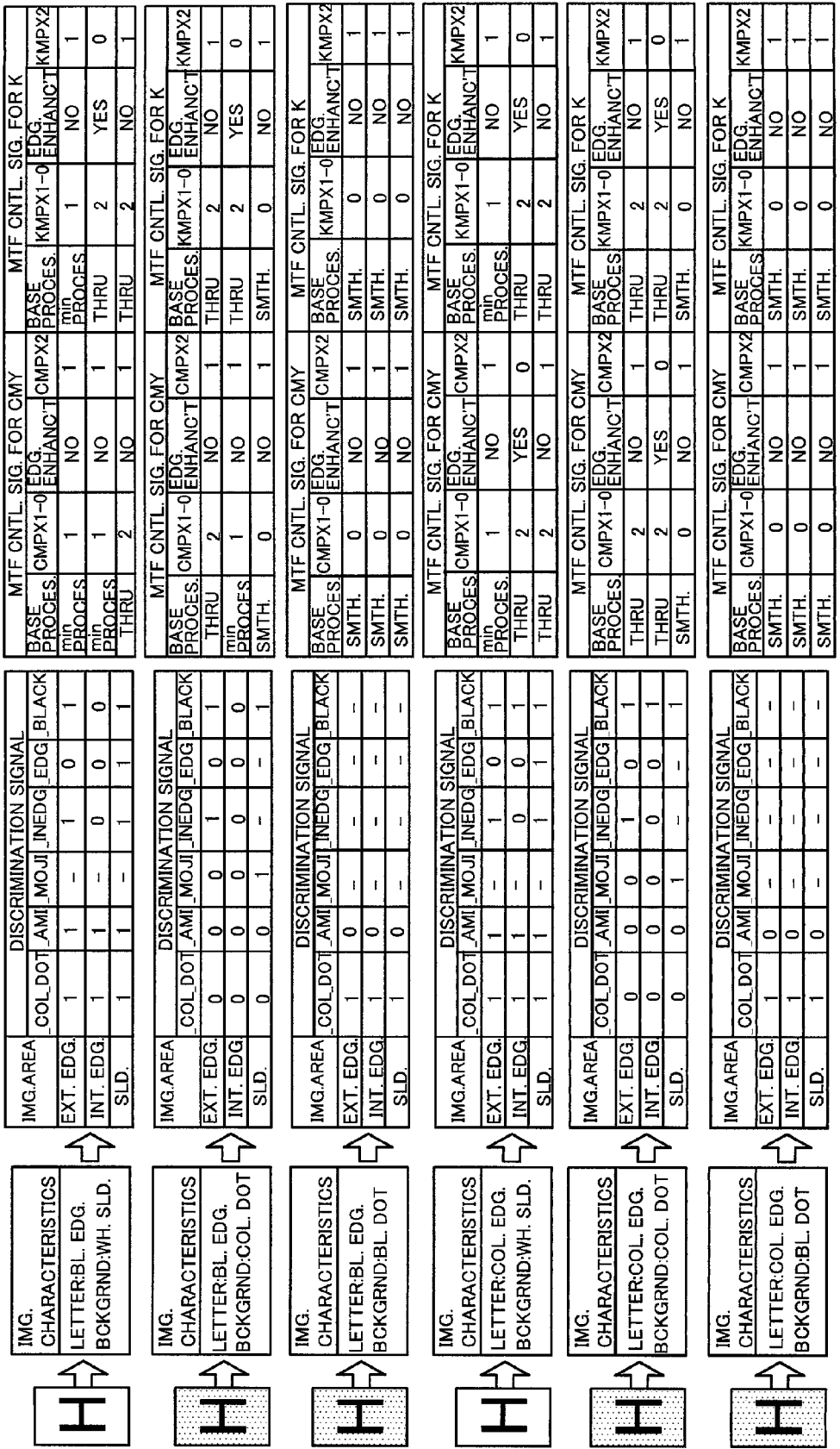
FIG. 15 is a view showing a part of the contents of a table at an MTF control signal generating section shown in FIG. 2.

FIG. 15 shows a part of a table that configures the MTF control signal generating section 34. The MTF control signal (CMPX1-0, KMPX1-0) is a signal that indicates the content of base processing executed at the MFT correcting section 34. In addition, an MTF control signal (CMPX2, KMPX2) is a signal that indicates whether or not edge enhancement processing is carried out at the MTF correcting section 21. The MTF control signal (CMPX) is a signal for CMY, and the MTF control signal (KMPX) is a signal for K. At the MTF correcting section 21, in the case where the MTF control signal (CMPX1-0, KMPX1-0) is 0, smoothing processing is executed; in the case where the signal is 1, min processing (minimization processing) is executed; and in the case where the signal is 2, no processing is carried out (hereinafter, referred to as "through processing"). In addition, in the case where the MTF control signal (CMPX2, KMPX2) is 0, edge enhancement processing is executed, and in the case where the signal is 1, edge enhancement processing is not executed.

Figure 16:
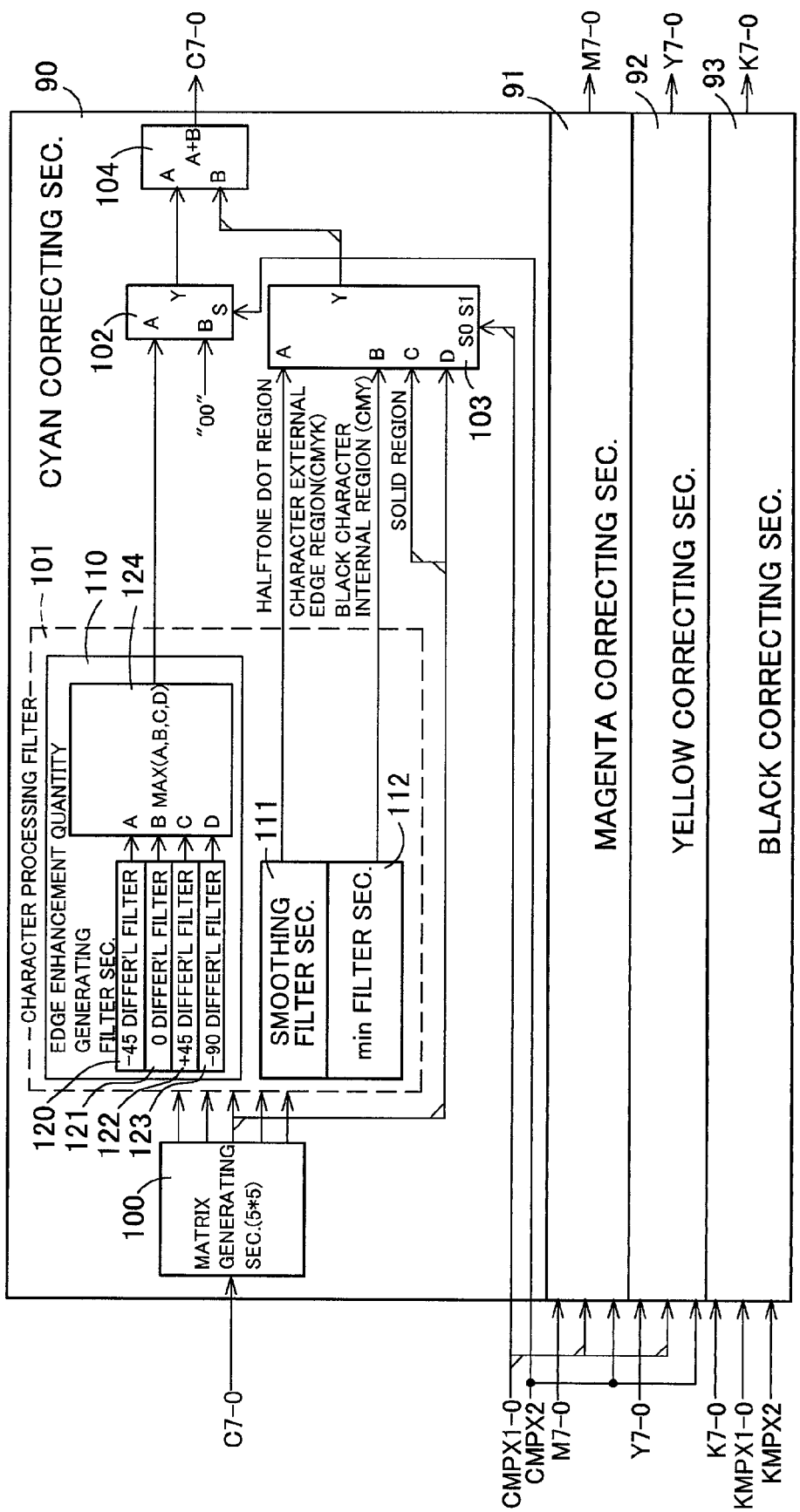
FIG. 16 is a block diagram depicting a schematic construction of an MTF correcting section shown in FIG. 1.

Turning to FIG. 1, the MTF correcting section 21 corrects image sharpness or the like. This MTF correcting section 21 comprises: a cyan (C) correcting section 90 corresponding to each color of CMYK; a magenta (M) correcting section 91; a yellow (Y) correcting section 92; and a black (K) correcting section 93 as shown in FIG. 16 so as to carry out correction processing for four colors at the same time. The CMY correction processing is controlled by an MTF control signal (CMPX2-0) generated at the region discriminating section 20, and K correction processing is controlled by the MTF control signal (KMPX2-0).

Now, a construction of each of the color correcting sections will be described in more detail. There are provided with the cyan (C) correcting section 90, magenta (M) correcting section 91, yellow (Y) correcting section 92, and black (K) correcting section 93, each of which has the same construction. Therefore, a construction of the cyan (C) correcting section 90 is described here, and descriptions of the other correcting sections are omitted here. This cyan (C) correcting section 90 includes: a matrix generating section 100; a character processing filter section 101 having a variety of filters; two selectors 102 and 103; and an adder 104, as shown in FIG. 16.

The matrix generating section 100 generates 5×5 pixel matrix data, and supplies the data to the character processing filter section 101. The character processing filter section 101 is composed of: an edge enhancement quantity generating filter section 110; a smoothing filter section 111; a min filter section 112. With such a construction, the character processing filter section 101 outputs edge enhancement quantity data, smoothing processing data, and min processing data.

The edge enhancement quantity generating filter section 110 includes: a −45 degree differential filter section 120; a 0 degree differential filter section 121; a 45 degree differential filter section 122; a 90 degree differential filter section 123; and a selector 124 that selects a maximum value of the data filtered by these filter sections. In the present embodiment, the −45 degree differential filter section 120 comprises a filter shown in FIG. 17; the 0 degree differential filter section 121 comprises a filter shown in FIG. 18; the 45 degree differential filter 122 comprises a filter shown in FIG. 19; and the 90 degree differential filter section 123 comprises a filter shown in FIG. 20.

In addition, the smoothing filter section 111 comprises a filter shown in FIG. 21 so that smoothing processing is executed. Further, at the min filter section 112, as shown in FIG. 22, processing is executed such that a minimum value of the 5×5 pixel matrix data is defined as target pixel data.

An output from the edge enhancement quantity generating filter section 110 is inputted to terminal A of the selector 102. "00" is inputted to terminal B of the selector 102, and an MTF control signal (CMPX2) is inputted to terminal S. In this manner, at the selector 102, either of the values inputted to terminals A and B is selected and outputted depending on the contents of MTF control signal (CMP2). That is, when the MTF control signal (CMPX2)=0, edge enhancement processing is executed, and thus, the value inputted to terminal A is selected and outputted at the selector 102. On the other hand, when the MTF control signal (CMPX2)=1, edge enhancement processing is not executed, and thus, the value inputted to terminal B is selected and outputted at the selector 102.

In addition, an output from the smoothing filter section 111 is inputted to terminal A of the selector 103, and an output from the min filter section 112 is inputted to terminal B of the selector 103. Further, outputs from the matrix generating section 100, i.e., data obtained when no processing is done by the character processing filter section 101 are inputted to terminals C and D of the selector 103. Furthermore, an MTF control signal (CMPX1-0) is inputted to terminal S of the selector 103. At the selector 103, any of the values inputted to terminals A to D is selected and outputted in accordance with the contents of the MTF control signal (CMPX1-0).

That is, when the MTF control signal (CMPX1-0)=0, smoothing processing is required. Thus, at the selector 103, the value inputted to terminal A is selected and outputted. In addition, when the MTF control signal (CMPX1-0)=1, min processing is carried out. Thus, at the selector 103, the value inputted to terminal A is selected and outputted. Further, when the MTF control signal (CMPX1-0)=2, through processing is carried out. Thus, at the selector 103, the value inputted to terminal C (or D) is selected and outputted.

An output from the selector 102 and an output from the selector 103 are inputted to terminals A and B of the adder 104 respectively. In this manner, at the adder 104, edge enhancement data ("00" if no edge enhancement is carried out) and processing data selected by the selector 103 are added, and the added data is obtained as an output (C7-0) from the MTF correcting section 21. Processing for the recording density signals (M, Y, K) of the other colors as well is executed in the same manner as for cyan(C).

In this way, image data (C7-0, M7-0, Y7-0, K7-0) of each color in which processing is applied in the MTF correcting section 21 is transmitted to an image output device such as printer via a printer interface (I/F) 22. Hence, reproduction image is obtained in the image output device.

Now, an operation of the entire color image processing apparatus having the above described construction will be briefly described here. First, document image information is read by the CCD sensor 11. The analog image data read by the CCD sensor 11 is converted into digital image data. Then, shading correction, interline correction, color aberration correction, magnification change/movement processing, color conversion processing, color correction, region discrimination processing, and MTF correction are applied sequentially to the digital image data. Then, based on the image data to which a variety of image processing is applied, the document reproduction image is outputted on a recording medium by a printer or the like via the printer interface (I/F) 22.

The region discriminating section 20 discriminates where the target pixel belongs to among from a color region, a monochrome region, a halftone dot region, a character region, and a halftone dot internal character region. With respect to the halftone dot region, character region, and halftone dot internal character region, it is discriminated whether or not these regions are based on color or monochrome.

Now, a method of discriminating a halftone dot internal character region characterized by the present invention will be described in detail. The halftone dot region is characterized in that a large number of halftone dot characteristics exist, but a small number of edges exist. In addition, the halftone dot internal character region is characterized in that a large number of edges exist, but a small number of halftone dot characteristics exist. That is, the halftone dot region and halftone dot internal character region are reversed in characteristics. By making best use of a difference in the characteristics, the halftone dot internal character region is precisely discriminated.

Specifically, the halftone dot internal character region is discriminated at the halftone dot internal character region signal generating section 33 provided at the region discriminating section 20. The OR circuit 75 computes a logical sum of the halftone dot discrimination isolation point signal (WAMI, KAMI) generated by the various-edge signal generating section 31. Then, the logical sum computed by the OR circuit 75 is inputted to the isolation point counting section 76. Then, the isolation point counting section 76 counts the number of white and black isolation points that exist in an 11×11 pixel matrix region. Then, the comparator 77 compares the isolation point count value with the reference value (CNTREF57-50). The comparison result is inputted to the AND circuit 82.

On the other hand, in parallel to the above processing, the AND circuit 78 computes a logical sum between the halftone dot internal character region detection internal edge signal (_EDGL) and halftone dot internal character region detection edge signal (_INEDG) generated by the various-edge signal generating section 31. Then, the logical product computed by the AND circuit 78 is inputted to the internal edge counting section 79. Then, the internal edge counting section 79 counts the number of internal edges that exist in a 3×3 pixel matrix region. Then, the comparator 80 compares the internal edge count value with the reference value (CNTREF67-60). The comparison result is inputted to the continuity detecting section 81. Then, the continuity detecting section 81 detects the continuity of the internal edges. Then, data concerning the count value of the internal edges and the presence or absence of continuity is inputted to the AND circuit 82.

Finally, at the AND circuit 82, in the case where the isolation point count value (WAMI+KAMI) is smaller than the reference value (CNTREF57-50), and moreover, the internal edge count value (_EDGL x _INEDG) is greater than the reference value (CNTREF67-60) and the internal edges are continuous, the target pixel is judged as belonging to the halftone dot internal character region. Then, the halftone dot internal character region signal (_MOJI) is set to "L" active. The halftone dot internal character region is discriminated for all the pixels of the input image data by repeatedly moving the target pixels in the main scanning direction one by one and moving them by one pixel in the subsidiary scanning direction when the pixel reaches a final position in the main scanning direction.

Figure 23:
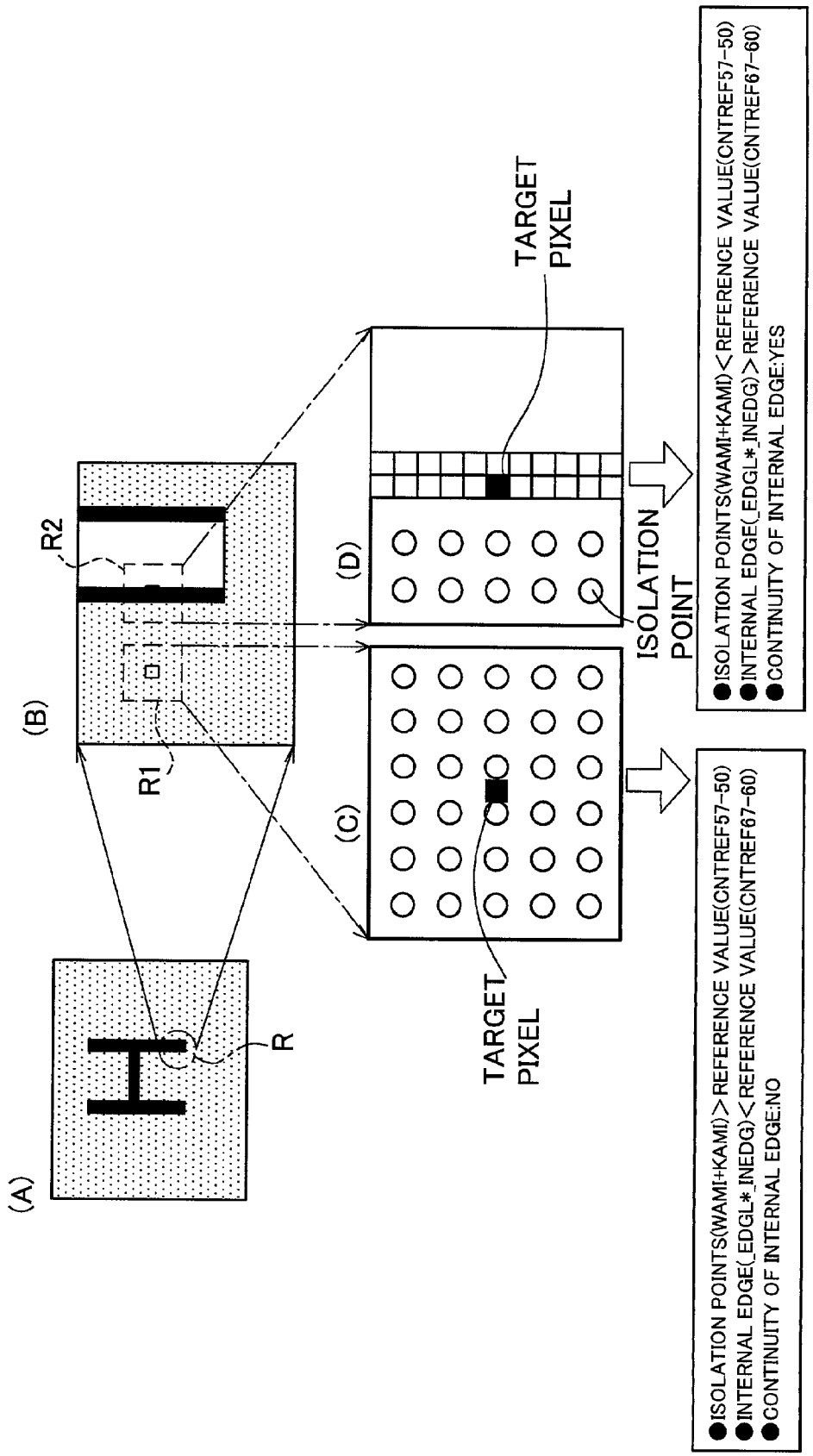
FIG. 23 is a view specifically illustrating a method of discriminating a character region in a halftone dot image.

Now, discrimination processing at the halftone dot internal character region signal generating section 33 will be described by way of showing a specific example shown in FIG. 23. Here, a description will be given by exemplifying discrimination processing in part of an image (region R in (A)

of FIG. 23 (refer to (B) of FIG. 23) on which uppercase letter H is drawn in the halftone dot as shown in (A) of FIG. 23.

First, in region R1 shown in (B) of FIG. 23, as shown in (C) of FIG. 23, isolation points exist all over the region, and no internal edge exist. Thus, at the halftone dot internal character region signal generating section 33, the comparator 77 judges that the isolation point count value (WAMI+KAMI) is greater than the reference value (CNTREF57-50). In addition, the comparator 80 judges that the internal edge count value (_EDGL x _INEDG) is smaller than the reference value (CNTREF67-60). Further, the continuity detecting section 81 judges that the internal edge is not continuous. Therefore, the halftone dot internal character region signal (_MOJI) is set to "H" by the AND circuit 82. That is, it is discriminated that the target pixel shown in (C) of FIG. 23 fails to belong to the halftone dot internal character region.

On the other hand, in region R2 shown in (B) of FIG. 23, as shown in (D) of FIG. 23, isolation points exist in half or less of the region, and the internal edges continuous at the center of the region exist. Thus, in the halftone dot internal character region signal generating section 33, the comparator 77 first judges that the isolation point count value (WAMI+KAMI) is smaller than the reference value (CNTREF57-50). In addition, the comparator 80 judges that the internal edge count value (_EDGL x INEDG) is greater than the reference value (CNTREF67-60). Further, the continuity detecting section 81 judges that the internal edges are continuous. Therefore, the halftone dot internal character region signal (_MOJI) is set to "L" by the AND circuit 82. That is, the target pixel shown in (D) of FIG. 23 is discriminated as belonging to the halftone dot internal character region.

As has been described above, the halftone dot internal character region can be discriminated because the halftone dot region and halftone dot internal character region are different from each other in their characteristics. That is, the halftone dot region is characterized in that a large number of isolation points exist, a small number of internal edges exist, and the internal edges are not continuous. On the other hand, the halftone dot internal character region is characterized in that a small number of isolation points exist, a large number of edges exist, and the internal edges are continuous. Thus, the halftone dot region and halftone dot internal character region are completely reversed in their characteristics. Therefore, the halftone dot internal character region can be precisely discriminated by making best use of a difference in characteristics of these regions each.

As a result of region discrimination carried out at the region discriminating section 20, i.e., in accordance with a variety of region attribute discrimination signals, the MTF correcting section 21 applies image processing according to a variety of attributes. Specifically, smoothing processing is applied to the halftone dot region, and edge enhancement processing is applied to the character region. Thus, when a character exists on a halftone dot image, smoothing processing is applied to the halftone dot region excluding the character region, and edge enhancement processing is applied to the halftone dot internal character region.

As has been described in detail, according to a color image processing apparatus of the present embodiment, the halftone dot internal character region signal generating section 33 that discriminates whether or not the target pixel belongs to the halftone dot internal character region is provided at the region discriminating section 20. The halftone dot internal character region signal generating section 33 comprises: an isolation point counting section 76; an internal edge counting section 79; and a continuity detecting section 81. In this manner, the halftone dot internal character region signal generating section 33 discriminates the halftone dot internal character region based on the detection results of the isolation point counting value caused by the isolation point counting section 76, the internal edge count value caused by the internal edge counting section 79, and the presence or absence of continuity of the internal edges caused by the continuity detecting section 81 by making best use of the fact that the halftone dot region and halftone dot internal character region are completely reversed in their characteristics. Thus, the halftone dot internal character region can be precisely discriminated, and proper image processing can be applied to the character region in the halftone dot image as well. Therefore, the character image in the halftone dot image is reproduced with high precision.

The above described embodiment is provided for mere illustrative purpose, and the present invention is not limited thereto. Of course, various modifications or variations can occur without departing the spirit of the invention. For example, in the above described embodiment, although an isolation point is detected as a halftone dot characteristic, any other point may be detected as far as such point characterizes a halftone dot without being limited thereto. In addition, the present invention is applicable to an image processing apparatus such as digital copying machine, printer, and facsimile machine other than above described embodiment. Further, specific numeral values shown in the above-described embodiment (for example, matrix size or the like) are provided for mere illustrative purposes.

What is claimed is:

1. An image processing apparatus comprising:
   a halftone dot characteristic detecting section that detects a halftone dot characteristic indicative of a halftone dot in image data;
   a first counter that counts the number of halftone dot characteristics that exist in a first region including a target pixel from among halftone dot characteristics detected by the halftone dot characteristic detecting section;
   an edge pixel detecting section that detects a pixel belonging to an edge region based on image data;
   a second counter that counts the number of edge pixels that exist in a second region including the target pixel from among edge pixels detected by the edge pixel detecting section;
   a discriminator that discriminates whether or not a region that includes the target pixel is a character region in a halftone dot region based on the count result of the first counter and the count result of the second counter.

2. An image processing apparatus according to claim 1, wherein the edge pixel detecting section contains an edge detector that detects an edge quantity and, detects an internal edge pixel such that a positive edge detection quantity has been detected by the edge detector.

3. An image processing apparatus according to claim 1, wherein the discriminator discriminates that the target pixel belongs to a character region in a halftone dot region in case that the count value of the first counter is smaller than a first threshold and the count value of the second counter is greater than a second threshold.

4. An image processing apparatus according to claim 1 further including a continuity detecting section that detects whether or not an edge has continuity, wherein the discriminator discriminates whether or not the target pixel belongs to a character region in a halftone dot region taking into consideration a detection result of the continuity detecting section.

5. An image processing apparatus according to claim 1 further including a correction unit that corrects image data based on a discrimination result of the discriminator.

6. An image processing apparatus according to claim 1, wherein the halftone dot characteristic detecting section contains a filter that detects isolate points as halftone dot characteristics.

7. An image processing apparatus according to claim 1, wherein the number of pixels in the first region is greater than the number of pixels in the second region.

8. An image processing apparatus according to claim 1, wherein the correction unit applies edge enhancement processing if the target pixel is in a character region in a halftone dot region.

9. An image processing apparatus according to claim 8, wherein the correction unit applies smoothing if the target pixel is in a region in a halftone dot region that is not a character region.

10. An image processing apparatus according to claim 1, wherein the first counter determines whether or not the target pixel in the first region belongs to a halftone dot region based on the count.

11. An image processing apparatus comprising:
  a first discrimination unit that discriminates whether or not each pixel of image data has a halftone dot characteristic indicative of a characteristic of a halftone dot region by using a first filter;
  a second discrimination unit that discriminates whether or not each pixel of image data is a pixel that belongs to an edge region by using a second filter;
  a first counter that counts the number of halftone dot characteristics that exist in a first pixel matrix consisting of a plurality of pixels containing a target pixel based on the discrimination result of the first discrimination unit;
  a second counter that counts the number of edge pixels that exist in a second pixel matrix consisting of a plurality of pixels containing the target pixel based on the discrimination result of the second discrimination unit;
  a discrimination unit that discriminates whether or not a region that includes the target pixel is a character region in a halftone dot region based on the count result of the first counter and the count result of the second counter; and
  an image processing unit that processes image data based on the discrimination result of the discrimination unit.

12. An image processing apparatus according to claim 11, wherein the second discrimination unit contains a discriminator that discriminates whether an edge region is an internal edge region or an external edge region, and pixels in an edge region the discriminator has discriminated an internal edge region is discriminated as edge pixels.

13. An image processing apparatus according to claim 11, wherein the discrimination unit discriminates that the target pixel belongs to a character region in a halftone dot region in case that a count value of the first counter is smaller than a first threshold and a count value of the second counter is greater than a second threshold.

14. An image processing apparatus according to claim 11 further including a continuity detecting section that detects whether or not an edge has continuity, wherein the discrimination unit discriminates whether or not the target pixel belongs to a character region in a halftone dot region taking into consideration a detection result of the continuity detecting section.

15. An image processing apparatus according to claim 11, wherein the first filter detects isolate points, and the first discrimination unit detects the isolation points as halftone dot characteristics.

16. An image processing apparatus according to claim 11, wherein the first pixel matrix is larger than the second pixel matrix.

17. An image processing apparatus according to claim 11, wherein the first counter determines whether or not the target pixel in the first pixel matrix belongs to a halftone dot region based on the count.

18. An image processing method comprising:
  a step 1 of discriminating whether or not each pixel of image data has a halftone dot characteristic indicative of a characteristic of a halftone dot region and discriminating whether or not each pixel of image data is an edge pixel that belongs to an edge region;
  a step 2 of counting the number of halftone dot characteristics that exist in a first pixel matrix consisting of a plurality of pixels including a target pixel based on the discrimination result in the step 1 and counting the number of edge pixels that exist in a second pixel matrix consisting of a plurality of pixels including the target pixel;
  a step 3 of discriminating whether or not a region that includes the target pixel is a character region in a halftone dot region based on the number of halftone dot characteristics and the number of edge pixels counted in the step 2; and
  a step 4 of processing image data based on the discrimination result in the step 3.

19. An image processing method according to claim 18, wherein the number of halftone dot characteristics are counted to determine whether or not the target pixel in the first pixel matrix belongs to a halftone dot region.

20. An image processing apparatus comprising:
  a halftone dot characteristic detecting section that detects isolation points as a halftone dot characteristic indicative of a halftone dot in image data;
  a first counter that counts the number of isolation points that exist in a first region including a target pixel from among isolation points detected by the halftone dot characteristic detecting section;
  an edge pixel detecting section that detects a pixel belonging to an edge region based on image data;
  a second counter that counts the number of edge pixels that exist in a second region including the target pixel from among edge pixels detected by the edge pixel detecting section;
  a discriminator that discriminates whether or not a region that includes the target pixel is a character region in a halftone dot region based on the count result of the first counter and the count result of the second counter.

* * * * *